Dec. 2, 1969     G. D. ANDERSON     3,482,004
MAKING OF V-BELTS
Original Filed Dec. 21, 1964     3 Sheets-Sheet 1
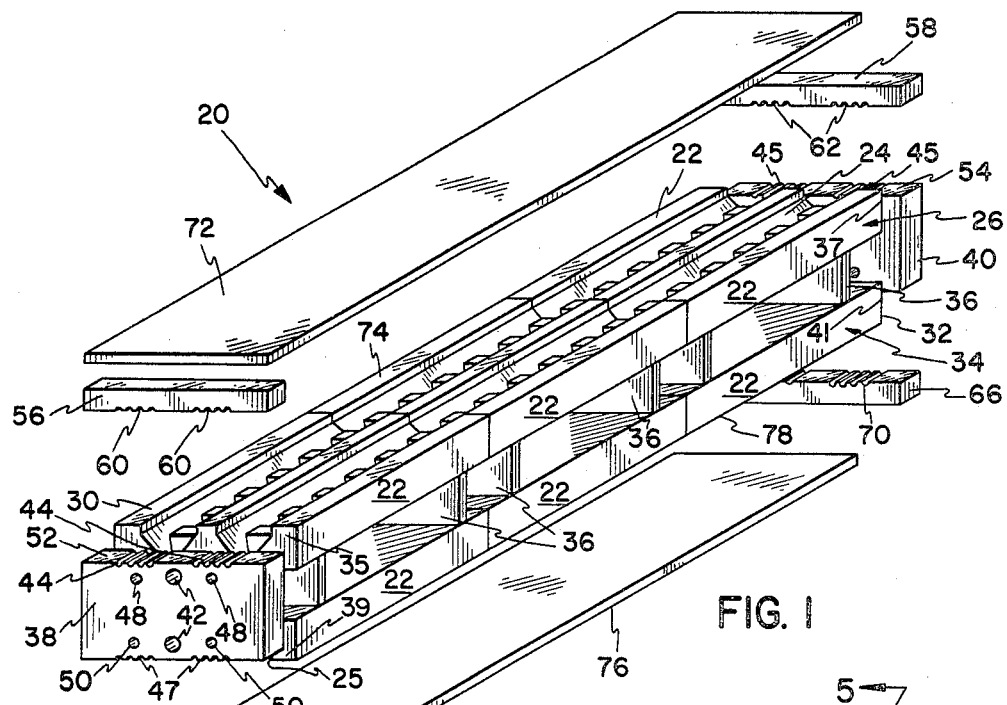
FIG. 1
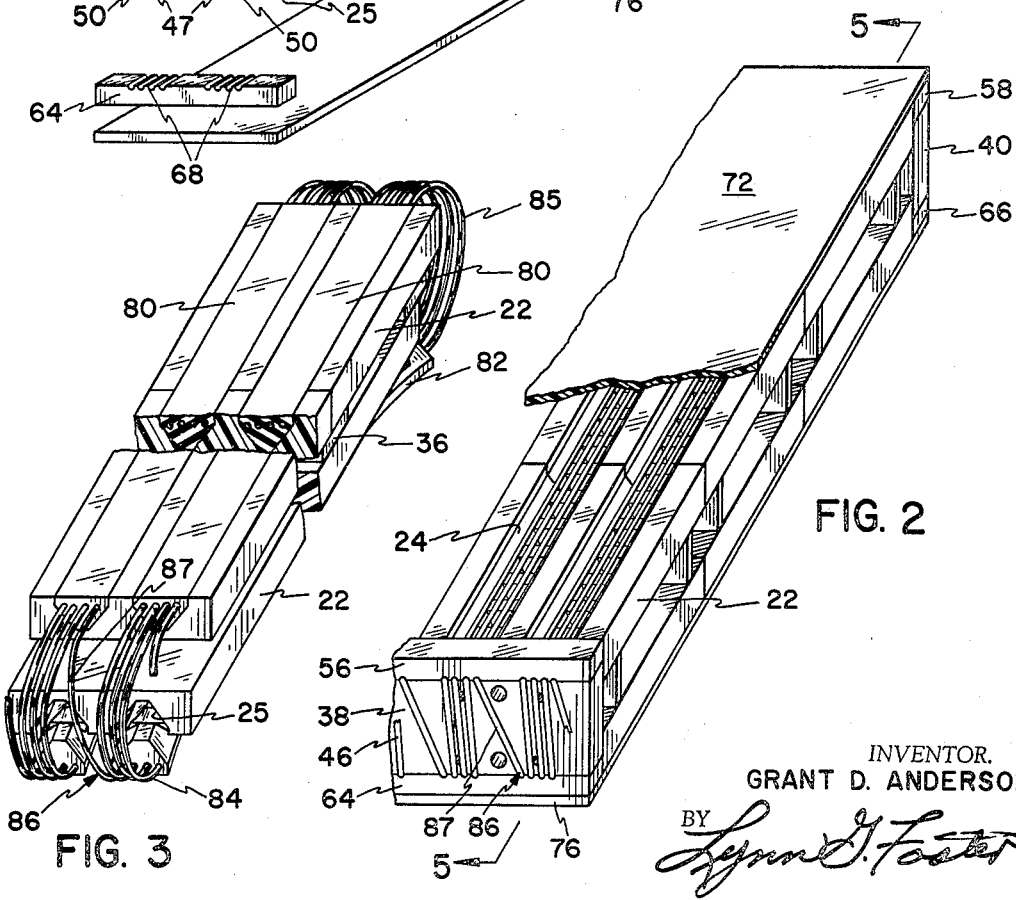
FIG. 2
FIG. 3
INVENTOR.
GRANT D. ANDERSON
BY Lynn G. Foster
ATTORNEY

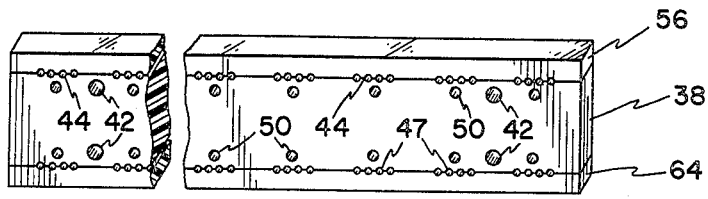
FIG. 4
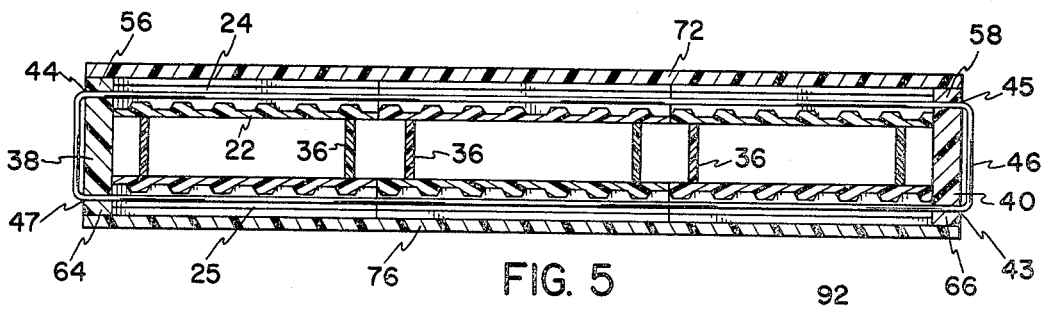
FIG. 5
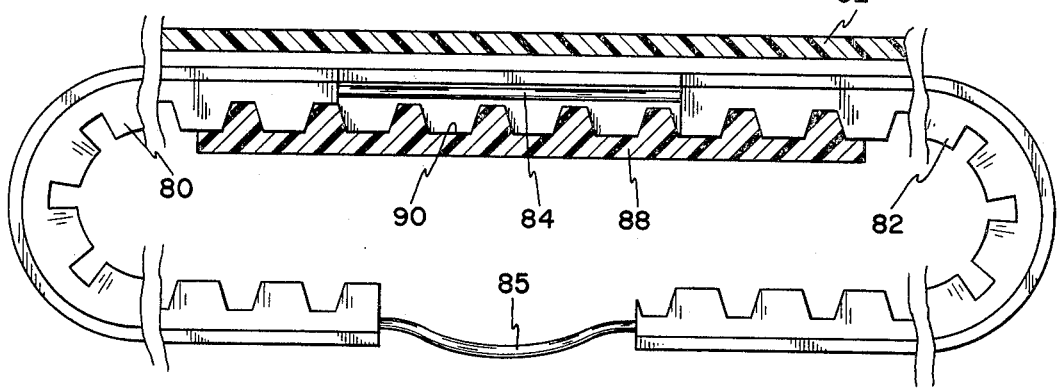
FIG. 6
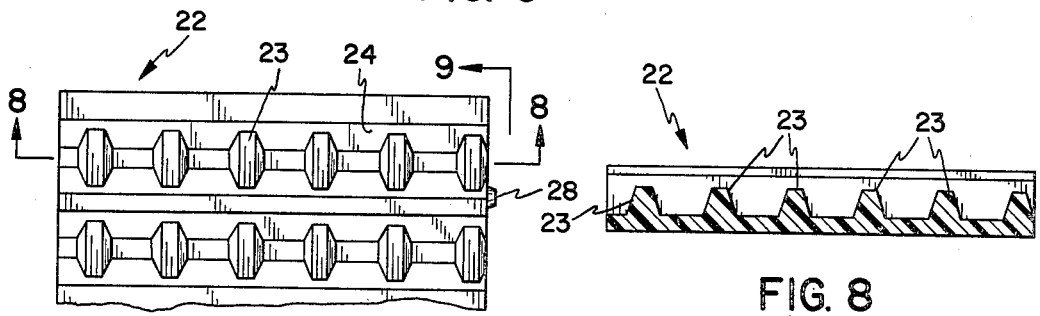
FIG. 8
FIG. 7
INVENTOR.
GRANT D. ANDERSON
BY
ATTORNEY

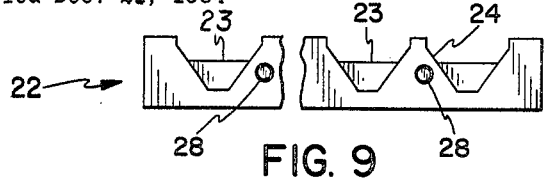
FIG. 9
FIG. 10
FIG. 11
FIG. 12
FIG. 13
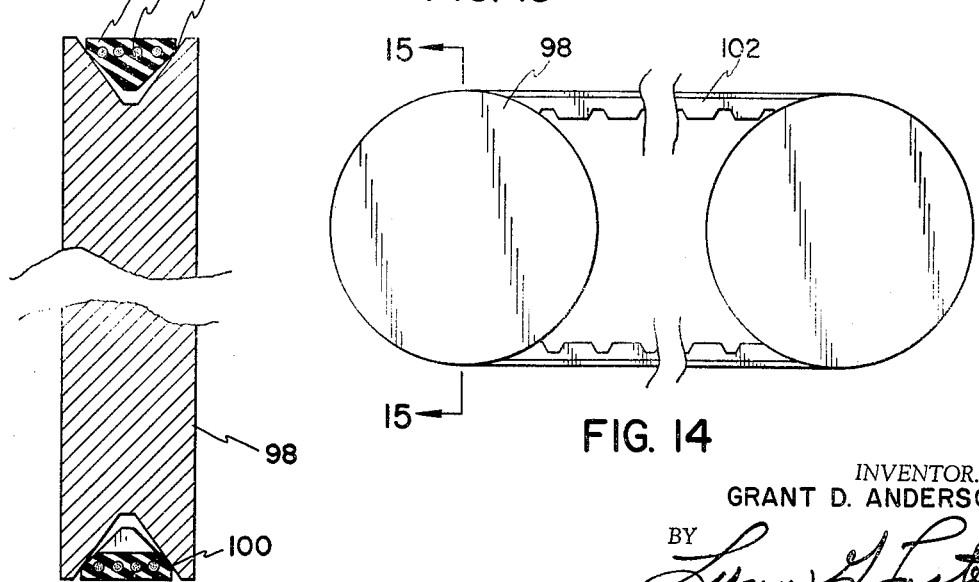
FIG. 14
FIG. 15
INVENTOR.
GRANT D. ANDERSON
BY
ATTORNEY United States Patent Office 3,482,004
Patented Dec. 2, 1969

3,482,004
MAKING OF V-BELTS
Grant D. Anderson, 368 W. 2725 S.,
Bountiful, Utah 84010
Continuation of application Ser. No. 420,021, Dec. 21, 1964. This application Dec. 11, 1967, Ser. No. 689,587
Int. Cl. H05b 9/06; B29d 3/02; B29f 1/10
U.S. Cl. 264—25
9 Claims

ABSTRACT OF THE DISCLOSURE

A method of producing a belt from polymerizable liquid synthetic elastomer which is placed in a suitable mold cavity previously provided with distributed reinforcement generally extending beyond the ends of the mold cavity, that portion of reinforcement within the mold cavity being substantially submerged in the liquid elastomer. The liquid elastomer is thereafter cured within the mold cavity by exposure to microwave energy to form a belt segment, comprising the submerged length of reinforcement and the cured elastomer, which belt segment is then removed from the mold. Next, a length of free reinforcement not encumbered by cured elastomer is placed within a mold cavity such that at least one end of the mentioned cured belt segment closes one end of the mold cavity. Thereafter additional polymerizable liquid synthetic elastomer is placed in the mold cavity surrounding the theretofore free reinforcement and cured by exposure to microwave energy to form a second belt segment integral end to end with the first belt segment.

---

The present invention relates to an improved method of casting automotive and industrial belts and more particularly to a method of casting endless flexible V-belts from liquid synthetic elastomer. This application is a continuation of my copending U.S. patent application Ser. No. 420,021, filed Dec. 21, 1964, now abandoned.

According to methods well-known in the art, it has been common practice to form V-belts of different sizes from synthetic polymeric materials placed in a mold exactly defining the size and configuration of belt desired. It has, therefore, been essential that a large number of individualized molds be available during manufacturing. Furthermore, the synthetic material from which prior art belts have been fabricated has been required to be either highly viscous and, therefore, difficult to handle effectively, or less viscous and polymerized or cured by prolonged exposure to heat, thereby severely limiting the rate at which the belt is produced.

With the foregoing in mind, it is a primary object of the present invention to provide a novel method for making automotive and industrial belts from liquid synthetic elastomer which overcomes or alleviates problems of the above-mentioned type.

In summary, the present invention generally provides the capability of rapidly curing finally-positioned liquid synthetic elastomer by microwave radiation and relates more specifically to manufacturing industrial and automotive belts by, for example, (a) placing the liquid elastomer in mold structure the size of which can be altered, (b) rapidly curing the liquid elastomer to form a molded, solid belt segment by relatively brief exposure to microwave energy and (c) repeating the placing and curing steps until the belt is completed.

Accordingly, it is another primary object of the present invention to provide a method of curing synthetic elastomer in a minimum amount of time using microwave energy.

Another important object of the present invention is to provide a method of forming endless belts having a plurality of sizes without requiring a comparable array of molds.

Another and no less important object of the present invention is to provide a method of forming segments of synthetic elastomer upon a closed or closeable loop of reinforcement.

These and other objects and features of the present invention will become more fully apparent from the following description and appended claims taken in conjunction with the accompanying drawings wherein:

FIGURE 1 is an exploded perspective of one suitable embodiment of a mold structure useable to perform the presently preferred method of this invention;

FIGURE 2 illustrates, in perspective, the mold of FIGURE 1 completely assembled with parts broken away to more clearly illustrate the disposition of reinforcement prior to introducing the liquid elastomer;

FIGURE 3 illustrates in fragmentary perspective the removal of a belt segment from the mold illustrated in FIGURE 1 after casting and curing of the liquid elastomer and after the mold has been opened;

FIGURE 4 illustrates an end piece useable with the molds illustrated in FIGURES 1 and 2 particularly depicting injection ports and reinforcement guides;

FIGURE 5 is a longitudinal cross-section taken along lines 5—5 of FIGURE 2;

FIGURE 6 depicts in partial longitudinal cross-section a mold into which previously molded belt segments have been situated to accommodate formation of another belt segment upon free reinforcement in end to end relation with the previous belt segments;

FIGURE 7 is a plan view of one suitable multi-cavity mold configuration;

FIGURE 8 is a longitudinal cross-section taken along lines 8—8 of FIGURE 7;

FIGURE 9 is an elevational view taken along lines 9—9 of FIGURE 7;

FIGURE 10 is a fragmentary cross-section depicting a belt segment cast in one of the cavities of the mold of FIGURE 7;

FIGURE 11 is a top plan view of the belt segment of FIGURE 10;

FIGURE 12 depicts a longitudinal cross-section of another suitable mold configuration;

FIGURE 13 is a fragmentary cross-sectional elevation of a belt segment cast in the mold in FIGURE 12;

FIGURE 14 schematically illustrates a V-belt produced according to a presently preferred method of this invention and spanning between two pulley wheels; and FIGURE 15 is a transverse cross-section taken along lines 15—15 of FIGURE 14 illustrating the disposition of the belt upon the pulley wheel.

The presently preferred method of making V-belts comprises the use of molds one preferred embodiment of which is illustrated in FIGURES 1 and 2. FIGURE 1 depicts a multi-component mold assembly 20 comprising a series of mold segments 22 axially aligned in end-to-end relation to form an upper row 26. Each mold segment 22 (best shown in FIGURES 7, 8 and 9) is preferably formed of rigid non-metallic material such as, for example, polyphenylene oxide and has an axial length of any suitable dimension. Each mold segment 22 is provided with at least one cavity 24 which is generally V-shaped in cross section (FIGURE 9). The axial length of the segment 22 is provided with spaced raised portions 23 which project a substantial distance upwardly into each cavity 24 as illustrated in FIGURES 7 and 8. Although the mold segment configuration illustrated in FIGURES 7–9 is presently preferred, any suitably configurated mold could be used, another example being illustrated in FIGURE 12.

The embodiment of FIGURE 1 has two parallel, side-by-side mold cavities 24 to accommodate formation of segments of two V-belts essentially simultaneously. It should be appreciated that the assembled mold segments 22 could present any desirable number of side-by-side mold cavities and the assembled mold 20 may be lengthened or shortened by selectively adding or removing segments 22 so that the same mold may produce a variety of V-belt lengths. Each mold segment 22 is provided with a forwardly projecting dowel 28 on the leading end 30 of the segment (see FIGURE 7). The trailing end 32 of the segment 22 is provided with mating, axially disposed blind bores (not shown) adapted to receive the dowels 28 and thus accommodate effective alignment of the mold cavities 22. A lower row 34 of aligned mold segments 22 is disposed in vertical stacked relation with the row 26, the cavity 24 in the upper row 26 opening upwardly and conversely the cavity 25 in the lower row 34 opening downwardly. The upper and lower rows 26 and 34 respectively are preferably separated a uniform distance by a plurality of removable spacers 36 situated at spaced locations between the rows 26 and 34. The spacers 36 may be selectively changed from the vertical position shown in FIGURES 1, 2 and 5 to a horizontal position shown in FIGURE 3 to reduce the separation distance between the rows 26 and 34.

The exposed leading end portions 35 and 39 of the assembled rows 26 and 34 are adapted to receive an end plate 38 and the trailing ends 37 and 41 thereof are adapted to receive an end plate 40. End plate 38 is provided with apertures 42 which receive the forwardly projecting dowels 28 (FIGURE 7) located at the leading ends 35 and 39 of the rows 26 and 34. The end plate 40 is provided with dowels (not shown) adapted to mate with blind bores (not shown) in the trailing ends 37 and 41 of the rows 26 and 34. Each end plate 38 and 40, best shown in FIGURE 4, has a horizontal length sufficient to accommodate any predetermined number of side-by-side cavities 24 and is preferably formed of rigid, non-metallic material which may be identical to the composition of the mold segments 22. In assembled position, each end plates 38 and 40 has a certical dimension sufficient to close a substantial portion of the exposed ends of both upper and lower mold cavities 24 and 25 simultaneously. The upper surfaces of the end plates 38 and 40 are provided with spaced guides 44 and 45 respectively which are, for example, axial grooves adapted to receive reinforcement cord 46 or the like and suitably position the cord within the mold cavity so as to prevent contact with the cavity surface.

The end plates 38 and 40 are further provided with injection ports 48 and 50 which accommodate injection of polymerizable liquid synthetic elastomer into the mold cavities 24 and 25. The upper surfaces 52 and 54 of the end plates 38 and 40 are adapted to receive upper end caps 56 and 58 which are provided with guides 60 and 62 corresponding to the guides 44 and 45 in the end plates 38 and 40 respectively. Lower end caps 64 and 66 are essentially identical with the upper end caps 56 and 58 respectively and are likewise provided with matching guides 68 and 70. The end caps 56 and 58 are preferably connected to an upper mold cover 72 which is adapted to be received by the upper surface 74 of the row of segments 26 to essentially enclose each mold cavity 24. Similarly, a lower mold cover 76 is preferably connected to the lower end caps 64 and 66 and is adapted to fit contiguously over the surface 78 of the lower row of segments 34 to enclose the cavity 25.

In one presently preferred method of practicing the invention, the mold segments 22 are assembled as illustrated in FIGURE 1, the number of segments used depending upon the desired peripheral length of the V-belt. When the mold segments 22 have been assembled and the end plates 38 and 40 have been properly positioned at the respective leading ends 35 and 39 and trailing ends 37 and 41 of the rows 26 and 34, reinforcement cord 46 is wound continuously from spaced guides 44 to guides 45 in the upper cavity 24 and thereaftetr from the spaced guides 43 to guides 47 in the lower cavity 25. The reinforcement cord 46 is preferably formed of suitable synthetic material such as nylon or fiberglass and is relatively tightly wound in a continuous manner such that the cord remains unbroken as it is uniformly distributed within the upper cavity 24 and the lower cavity 25 of the first and any subsequent side-by-side cavities as shown in FIGURE 2. The reinforcement 46 which is disposed within the cavities 24 and 25 are maintained in a taut condition essentially central of each cavity as shown in FIGURE 5 and thus preferably do not contact any surface within the cavity.

When the reinforcement has been properly located, the end caps 56, 58, 68 and 70 along with the mold covers 72 and 76 are placed in their respective assembled locations upon the assembled mold as shown in FIGURE 2. The available space in the mold cavities 24 and 25 is then filled preferably to capacity with polymerizable liquid synthetic elastomer. Any suitable polymerizable liquid elastomer could be used, for example, polyurethanes and neoprene. The liquid synthetic elastomer is preferably injected into the cavities 24 and 25 through the injection ports 48 and 50. When the cavities 24 and 25 have been sufficiently filled, liquid elastomer will begin to extrude from similar injection ports in the end plate 40. If desired, the injection ports 48 and 50 may then be sealed by the use of corks or the like.

It is preferred that the liquid elastomer be polymerized by exposure to microwave energy. The inventor has found that microwave energy rapidly and effectively polymerizes or cures liquid elastomer in a surprisingly short time increment. Where molds are used to contain the polymeric material, the molds should preferably be made of non-metallic material having suitable dielectric properties so as to reflect a negligible amount of the energy and thereby effect uniform curing. Normally, the necessity for considering the metallic nature of surrounding material does not as frequently occur where molds are not used, such as when the liquid elastomer exists as a film formed by suitable techniques such as atomizing or when liquid synthetic elastomer is used in the variety of other forms where the proximity of any metallic material is normally relatively remote.

The entire assembled mold 20 is preferably free of metallic material so that effective polymerization of the liquid elastomer will occur when the properly injected mold 20 is placed adjacent a microwave source and exposed to microwave energy. The microwave source manufactured by Eimco Corporation Number CCS-1 has been found to be effective in rapidly curing liquid elastomer although, clearly, any suitable microwave source could be used. The use of a microwave source is presently preferred, however, any suitable curing medium such as a conventional heat oven could be used. When conventional heat is used to cure the liquid elastomer, metal molds and/or wire reinforcement can be effectively used.

The cured product, best illustrated in FIGURES 3 and 6 comprises an upper belt segment 80 and a lower belt segment 82 joined at both ends by free or exposed reinforcement 84 and 85, thus forming a closed loop of alternate belt segments and free reinforcement. Each mold segment 80 or 82 is provided with a plurality of teeth 94 and essentially encapsulates a portion of the reinforcement cord 46 (see FIGURES 10 and 11). The upper portion of each belt segment is preferably flat and smooth although it should be appreciated that it may assume any configuration determined by the shape of the mold covers 72 and 76. The mold illustrated in FIGURE 12 will produce the V-belt shape depicted in FIGURE 13. The mold of FIGURE 12 is shown in this embodiment as being formed of metal which accommodates curing of the liquid elastomer with conventional heat.

It is apparent that each side-by-side mold cavity forms a separate closed loop of alternate belt segments and free reinforcement, each closed loop being connected to the next by a single strand of connecting reinforcement cord 86 (best illustrated in FIGURE 3). As depicted in FIGURE 3, the belt segments 80 and 82 are removed from the mold asembly 20 by first collapsing the spacers 36 in the manner previously described and removing the end plates 38 and 40 along with the mold covers 72 and 76. The belt segments 80 and 82 are then removed from the mold by peeling the segments from the cavities 24 and 25 respectively. Each individually complete loop is separated from the next by severing the connecting cord 86 for example at location 87. Thereafter, one end of each of the belt segments 80 and 82 may be positioned in a mold 88 as illustrated in FIGURE 6. The mold 88 may be one or more of the mold segments 22 illustrated in FIGURE 1 or another similarly configurated mold. The teeth of the belt segments are inserted into the mold at a location which draws the free reinforcement 84 taut within the mold cavity. Thereafter liquid synthetic elastomer is placed in the mold cavity 90 until the free reinforcement 84 is completely immersed. Optionally a cover plate 92 may be used to contain the liquid elastomer within the cavity 90. The liquid elastomer is then preferably polymerized with microwave energy, similar to the manner previously described, to form another belt segment which joins the belt segments 80 and 82. This process is repeated on the remaining exposed reinforcement 85 until an endless belt is formed.

In another presently preferred method embodiment of the invention, the upper row 26 of belt segments 22, illustrated in FIGURE 1, could be used exclusive of the lower row 34. Reinforcement such as fabric or cord may be temporarily attached to the end plates 38 and 40 and the mold cavity filled with liquid synthetic elastomer. Curing of the liquid elastomer forms a single belt segment having exposed free ends of reinforcement. The reinforcement may be joined to form a closed loop by ultrasonically welding the free ends of the reinforcement using for example the ultrasonic seal model 60B manufactured by Branson Instruments, Inc. located in Danbury, Conn. Thereafter the joined reinforcement may be positioned within the mold 88 and the endless belt formed according to the practice previously mentioned.

According to the presently preferred embodiments of the invention, an infinite number of belt sizes may be produced using the same mold by simply adding or deleting mold segments to achieve the desired size. Thus, as indicated in FIGURE 14, an endless V-belt 102 formed on an unbroken loop of reinforcement may have one of a wide variety of sizes any one of which may be formed from a single basic mold assembly. Moreover the high degree of frictional resistance presented by the elastomer comprising the V-bedt, accommodates use of V-belt configurations which engage conventional pulley wheels 98 only along a limited portion 100 of the endless V-belt 102 (FIGURE 15). This limited engagement of the belt 102 and the pulley wheel 98 reduces wear and increases the life of the belt. Finally, the exposure of the liquid elastomer to microwave radiation greatly decreases the curing or setting time necessary to completely polymerize the liquid elastomer. This significant improvement in the art makes possible greatly accelerated V-belt manufacture with no sacrifice in quality.

The invention may be embodied in other specific forms without departing from the spirit or essential characteristics thereof. The present embodiments are, therefore, to be considered in all respects as illustrative and not restrictive, the scope of the invention being indicated and all changes which come within the meaning and range of equivalency are therefore to be embraced.

What is claimed and desired to be secured by United States Letters Patent is:

1. In a method of producing an endless belt, the steps of:
   placing a loop of flexible reinforcement so that the weight of the reinforcement is uniformly distributed with the loop, the loop comprising a plurality of strands so that a part of the length of the flexible, through essentially unextensible reinforcement loop longitudinally spans a variable length mold cavity and the remaining part of the reinforcement is situated beyond the mold cavity, the placing step further comprising axially aligning the strands of the loop within the mold cavity so that the strands are generally taut to prevent extensibility of the endless belt;
   introducing polymerizable liquid synthetic elastomer into the variable length mold cavity such that the liquid elastomer fills available cavity space and thereby envelopes the reinforcement within the mold cavity;
   curing the liquid elastomer within the mold cavity to form a segment of the belt with the part length of reinforcement exterior of the mold remaining free from the cured elastomer;
   removing the belt segment from the mold;
   placing part of the reinforcement loop comprising free unenveloped reinforcement longitudinally within a mold cavity with at least one end of the cured belt segment situated to close one end of the mold cavity;
   introducing additional polymerizable liquid synthetic elastomer into the mentioned mold cavity to fill available cavity space and abut the one end of the cured belt segment and envelope the theretofore free reinforcement in the mold cavity;
   curing the last-mentioned liquid elastomer within the mold cavity to form a second belt segment configurated substantially similar to the first belt segment and integrally fused in end to end relation with the first belt segment; and
   serially repeating the last mentioned removing, placing, introducing and curing steps until the entire loop of flexible reinforcement is enveloped in cured elastomer so that any one of a plurality of endless belt sizes can be formed.

2. In a method as defined in claim 1 wherein said first reinforcement placing step is preceded by assembling a mold structure having spaced mold cavities into and selected one of a plurality of lengths, and further comprises placing a portion of the same reinforcement loop in at least two cavities and thereafter introducing polymerizable liquid synthetic elastomer into the cavities and curing the elastomer to essentially jointly form spaced belt segments having the preselected size corresponding to the length of the mold cavity along and around the same reinforcement loop.

3. In a method as defined in claim 1 wherein said first reinforcement placing step further comprises serially winding unbroken essentially inextensible reinforcement to comprise a loop of a plurality of strands disposed in generally parallel relation so that a part of the loop of strands is located within the mold cavity in spaced relation from all interior mold surfaces and part of the loop is located outside the mold cavity.

4. In a method as defined in claim 1 wherein said introducing steps comprise filling a mold cavity having serially disposed undulating portions with sufficient liquid synthetic elastomer to form a plurality of teeth in the resulting belt segment.

5. In a method as defined in claim 1 wherein said first mentioned placing step comprises winding unbroken reinforcement strands through a plurality of spaced mold cavities so that only part of each reinforcement strand is disposed within each mold cavity and said introducing step comprises serially filling each cavity to form individual segments of a plurality of essentially independent belts.

6. In a method as defined in claim 1 wherein said curing step comprises exposing the liquid synthetic elastomer within the mold to microwave energy for a short time to polymerize the elastomer.

7. In a method as defined in claim 1 wherein the unifromly distributed non-metallic reinforcement is in a taut condition within the mold cavity which is adapted to form elastomer having any one of a plurality of sizes and which is essentially free of metallic material, displacing the polymerizable elastomer in the mold cavity to encapsulate reinforcement and passing microwave radiation through the polymerizable elastomer and the mold with no more than negligible reflection of the radiation at the mold for a very brief period of time while maintaining the material generally in the deposited disposition to rapidly and generally uniformly cure the elastomer into a polymerized solid conforming in configuration to the shape of the mold cavity.

8. A method of producing an endless belt comprising in seriatim:
   forming a loop of essentially inextensible though flexible reinforcement so that a substantially uniform distribution of weight exists over the loop;
   immersing only a part length of the loop in liquid elastomer situated in a mold cavity;
   exposing the part length of the loop to microwave radiation until the elastomer is cured to a polymerized solid;
   immersing an adjacent part length of the loop in additional liquid elastomer with at least one end of the cured elastomer situated to close one end of the mold cavity so that the liquid elastomer is contiguous with the polymerized solid; and
   exposing the adjacent part length of the loop to microwave radiation until the additional elastomer is cured into one polymerized solid piece.

9. In a method of producing an endless V-belt in a partible mold comprising a plurality of spaced cavity molds maintained in fixed relation one to another;
   assembling at least some of the plurality of the spaced molds into a partible mold assembly having any desired one of a variety of sizes;
   successively winding unbroken reinforcement so that each reinforcement strand is generally axially aligned with the mold cavity and drawn taut through spaced guides at each end of each cavity such that the reinforcement is looped with a portion of one loop disposed essentially uniformly within each mold cavity and another portion of the one loop remaining outside the mold cavity, all the mentioned loop portions unitarily forming a plurality of interconnected spaced essentially closed loops that are selectively separable;
   injecting liquid elastomer into each partible mold cavity until the available space is substantially filled thereby substantially encapsulating the portion of each unbroken loop of reinforcement disposed within each mold cavity;
   curing the elastomer to form a series of individually complete belt segments each respectively disposed on one unbroken reinforcement loop;
   severing the interconnection between the several reinforcement loops;
   removing each belt segment and encapsulated reinforcement from the partible mold;
   placing unencapsulated portions of each unbroken reinforcement loop section with a mold cavity such that at least one end of the belt segment on the loop closes one end of the mold cavity;
   subsequently filling the cavity with liquid elastomer; and
   curing the liquid elastomer.

References Cited

UNITED STATES PATENTS

| 3,415,924 | 12/1968 | Girardi | 264—229 |
| 3,058,165 | 10/1962 | Purvis | 264—22 X |
| 3,114,598 | 12/1963 | Beckadolph | 18—59 |
| 3,142,716 | 7/1964 | Gardener | 264—272 |
| 3,164,026 | 1/1965 | Terhune | 74—233 |
| 3,223,765 | 12/1965 | McNeil | 264—229 |

FOREIGN PATENTS 744,907   2/1956   Great Britain.

OTHER REFERENCES

Foam Molding, May 1963.

ROBERT F. WHITE, Primary Examiner

RICHARD R. KUCIA, Assistant Examiner

U.S. Cl. X.R.

18—36; 264—250, 254, 277